Feb. 27, 1940.　　　G. V. WATTS　　　2,192,056
HOT WIRE LEAD STRIPPER
Filed June 26, 1937
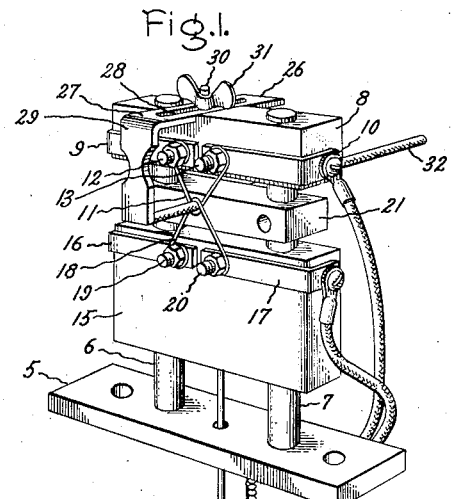
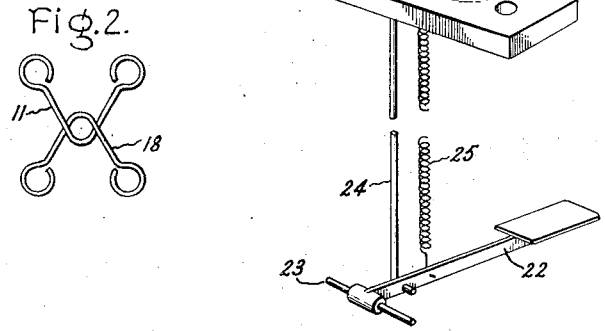
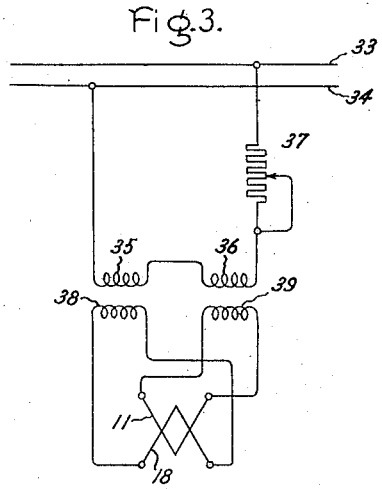
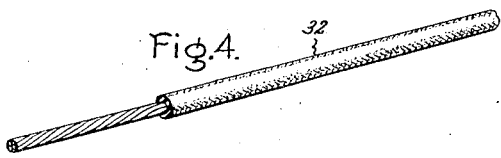
Inventor:
George V. Watts,
by Harry E. Dunham
His Attorney.

Patented Feb. 27, 1940

2,192,056

UNITED STATES PATENT OFFICE 2,192,056

HOT WIRE LEAD STRIPPER

George V. Watts, Alden, Pa., assignor to General Electric Company, a corporation of New York Application June 26, 1937, Serial No. 150,581

3 Claims. (Cl. 81—9.51)

My invention relates to wire insulation stripping machines, and more particularly to a machine which burns the insulation to separate a section thereof from the remaining insulation on the wire.

One object of my invention is to provide a machine whereby a length of insulation may be rapidly stripped from the ends of wires without injury to the wire.

Another object of my invention is to provide an improved burning unit by means of which only a sufficient portion of the insulation, on a metal wire, is burnt to separate a section thereof from the remaining insulation.

For a better understanding of my invention, together with other and further objects thereof, reference is had to the following description, taken in connection with the accompanying drawing, and its scope will be pointed out in the appended claims.

In the accompanying drawing, Fig. 1 is a front perspective view of a wire stripping machine built in accordance with my invention; Fig. 2 is an enlarged view of the burning elements used in the machine of Fig. 1; Fig. 3 is a circuit diagram of connections for the burning elements, and Fig. 4 is a view of a stripped wire end.

Referring to the drawing in detail, Fig. 1 discloses a machine built in accordance with my invention comprising a base plate 5 upon which rods 6 and 7 are rigidly and vertically mounted, in any convenient manner, to support a stationary block 8 in a horizontal position at their respective upper ends. The block 8 carries terminals 9 and 10, to which are connected the ends of a V-shaped insulation burning element 11 comprising a resistance wire looped at its ends to surround studs 12 and 13 on the ends of the terminals 9 and 10 respectively. A second block 15 is slidably mounted on the rods 6 and 7, below the block 8, and is provided with terminals 16 and 17, to the ends of which a second insulation burning element 18 is attached by means of studs 19 and 20.

The insulation burning elements 11 and 18, as illustrated in Fig. 2, are, in accordance with my invention, made of any suitable resistance wire, such as nichrome, for example, which is capable of rising to a high temperature responsive to current flowing through it without undue deterioration. The wire used in the illustrated machine is .064 inch in diameter and is slightly flattened to speed up its burning action. Suitable lengths of the wire are bent into a V-shaped element in order to form a crotch into which an insulated wire may be laid, and therefore the insulation may be brought into contact with the heated wire through an arc substantially half way around the insulation. The two elements are then arranged opposite to each other and are crossed, or interlocked, so that when they moved in opposite directions the crotch of one element moves into the crotch of the other element. They are arranged as nearly parallel and contiguous to each other as this interlocking will permit. When these elements are therefore so moved in opposite directions and an insulated wire is placed into the crotch of one element, this element contacts one-half of an annular section of the insulation and the second element is moved into contact with the insulation on the opposite half of that section. When the elements are then raised to burning temperatures by the passage of current through them, a substantially continuous annular section of the insulation is burned, and a length of insulation is thereby separated from the remainder, or continuous insulation, so that the wire may be withdrawn from the crotches of the elements and the unburned but separated section of the insulation stripped therefrom during such withdrawal.

As pointed out above, the second heating element 18 is also V-shaped, but is arranged with its apex above its ends. It is furthermore interlocked with the element 11 and is movable with the block 15 between a lower position at which the two elements engage at their apexes and an upper position at which the units overlap and form a rectangular space for receiving the largest diameter of insulated wire for which the machine is designed. This overlap is predetermined and established by the width of a block 21 which is slidable on the rods 6 and 7 between the blocks 8 and 15 and establishes the spacing between these blocks when the block 15 is in its upper end position.

The block 15 is movable along the rods 6 and 7 by means of a pedal 22 pivoted on a shaft 23 and connected by means of rod 24 to the block 15. A spring 25 connected between the pedal 22 and the base plate 5 raises the pedal, causing it to rotate counter-clockwise about its pivotal shaft 23. A manual pressure on the end of the pedal 22 moves the block 15 downwardly along the rods 6 and 7 against the bias of the spring 25.

In operation, a wire-end such as wire 32, for example, which is to be stripped is placed into the apex or crotch of the stationary burning element 11 by being first passed through a hole in the block 21. This block is slidable between the blocks 8 and 15 on the rods 6 and 7. The block is slightly raised manually during the movement of the wire so that the end of the wire will pass above the apex of the element 11 and below the apex of the element 18. When thereafter, the heating units engage the wire, the block 21 will hold the wire horizontally and will slide with the wire if it should be moved laterally by the heating units during the clamping and burning action. A length gauge 26 limits the movement of the wire through the block. The length gauge 26, comprises a horizontal arm 27, provided with a slot 28, and a vertical arm 29 projecting down over the side of block 8. The gauge is mounted in a channel on the upper surface of the block 8 by means of a bolt 30 and a wing nut 31. By loosening the wing nut 31, the vertical arm 29 of the gauge may be moved to a desired position, the bolt 30 sliding in the slot 28 during such positioning. When the vertical arm 29 is at the desired distance from the face of the block 21 and from the burning elements, the wing nut may be tightened.

When the wire is finally pushed through the hole in block 21, it lies in the apex of the upper element 11 and the end thereof engages the surface of the vertical arm. The lower element 18 is then moved down into contact with the insulation and the wire is clamped down against the fixed element 11, whereby the two elements engage an annular narrow section of the insulation around the wire, the sliding block 21 assuming a position substantially half way between the fixed and movable blocks. The elements are brought to burning temperature by the passage of current through them and burn the insulation in a narrow path around the wire. The section of the insulation between the heating elements and the length gauge is thereby separated from the remainder of the insulation on the wire and the operator may withdraw the wire 32 without changing the position of the burning elements 11 and 18. The separated section of the insulation is in this manner stripped from the wire by the burning elements.

In Fig. 3, I have illustrated a circuit diagram of connections for supplying the burning elements 11 and 18 with current. The diagram indicates a source of power comprising the conductors 33 and 34 to which are connected a pair of primary windings 35 and 36 which may be connected in series with each other, as indicated in the drawing, and with a regulating resistor 37. A pair of secondaries 38 and 39 are connected respectively to the elements 18 and 11. The secondaries are insulated from each other, and no electrical potential exists between the two circuits. It is therefore evident that the two elements 11 and 18 may actually contact each other during operation without causing any arc, and consequent deterioration of the elements.

In Fig. 4 I have illustrated the wire 32 with its end stripped of insulation subsequent to the operation as above described.

What I claim as new and desire to secure by Letters Patent of the United States is:

1. In a wire stripping machine, the combination of a pair of insulation burning elements, each of said elements being formed to provide a crotch, means for supporting said elements in interlocking relation with the opening ends of said crotches extending in different directions with respect to each other in substantially the same plane whereby said elements complement each other to form an opening to receive an insulated wire, means for moving said elements relatively to each other to constrict said opening and to engage a substantially continuous annular section of an insulating wire placed in said opening, and means for supplying heating current to said elements for raising them to the burning temperature of an engaged section of insulation.

2. In a wire stripping machine, the combination of a pair of V-shaped burning elements, means for supporting said elements in overlapping and interlocked relationship with the open ends of said elements extending in different directions with respect to each other in substantially the same plane to form a substantially annular opening surrounded by the sides of said elements, means for moving said elements relatively to each other to constrict said opening thereby bringing said elements into contact with a substantially continuous annular section of an insulated wire placed in said opening, and means for heating said elements to burning temperatures and burning the insulation placed in contact with said elements.

3. In a wire stripping machine, the combination of a pair of burning elements comprising respectively a wire bent to form a crotch, means for supporting said elements in interlocked and overlapping relationship with the open ends of said elements facing in opposite directions, means for moving said elements to constrict the opening formed by the sides of said overlapped elements to engage the surface of an insulated wire placed in said opening, and means for passing current through said heating elements to raise them to burning temperatures.

GEORGE V. WATTS.